(12) United States Patent
Ohta

(10) Patent No.: US 7,978,590 B2
(45) Date of Patent: Jul. 12, 2011

(54) OPTICAL PICKUP APPARATUS, REPRODUCING APPARATUS, RECORDING APPARATUS, AND TRACKING ERROR SIGNAL GENERATION METHOD

(75) Inventor: Keisuke Ohta, Mihara (JP)

(73) Assignee: Sharp Kabushiki Kaisha, Osaka-shi (JP)

( * ) Notice: Subject to any disclaimer, the term of this patent is extended or adjusted under 35 U.S.C. 154(b) by 206 days.

(21) Appl. No.: 12/367,393

(22) Filed: Feb. 6, 2009

(65) Prior Publication Data

US 2009/0201777 A1 Aug. 13, 2009

(30) Foreign Application Priority Data

Feb. 8, 2008 (JP) ................................. 2008-029761

(51) Int. Cl.
*G11B 7/00* (2006.01)
(52) U.S. Cl. ................. 369/124.12; 369/44.41
(58) Field of Classification Search .............. 369/124.12, 369/44.41
See application file for complete search history.

(56) References Cited

U.S. PATENT DOCUMENTS

| | | | |
|---|---|---|---|
| 4,520,469 A | 5/1985 | Todokoro et al. | |
| 4,775,968 A | 10/1988 | Ohsato | |
| 5,532,999 A * | 7/1996 | Aikoh et al. ................. 369/120 |
| 6,185,167 B1 * | 2/2001 | Arai et al. .................. 369/44.23 |
| 7,313,061 B2 * | 12/2007 | Nishimoto et al. ........ 369/44.37 |
| 7,428,201 B2 * | 9/2008 | Nakao et al. .............. 369/53.22 |
| 2002/0093893 A1 * | 7/2002 | Matsuda .................... 369/44.41 |
| 2004/0001419 A1 * | 1/2004 | Ariyoshi et al. ......... 369/112.04 |
| 2005/0286360 A1 | 12/2005 | Nakao | |
| 2008/0068944 A1 * | 3/2008 | Kadowaki et al. ......... 369/44.41 |

FOREIGN PATENT DOCUMENTS

| | | |
|---|---|---|
| JP | 58-150145 | 9/1983 |
| JP | 61-094246 | 5/1986 |
| JP | 2005-346882 | 12/2005 |
| JP | 2006-031773 | 2/2006 |

* cited by examiner

*Primary Examiner* — Wayne R Young
*Assistant Examiner* — Linh T Nguyen
(74) *Attorney, Agent, or Firm* — Morrison & Foerster LLP

(57) ABSTRACT

An optical pickup apparatus, a reproducing apparatus, a recording apparatus, and a tracking error signal generation method are provided. Four light-receiving elements receive stray light of main and sub beams reflected from, out of a plurality of recording layers of the optical disk, the one other than that for effecting recording or reproduction. The four light-receiving elements are disposed individually near every side of the four-part split light-receiving element, of which light-receiving elements are disposed between the two-part split light-receiving elements. Based on stray-light intensity detected by the four light-receiving elements, intensity distribution is calculated for tracking-error signal correction.

9 Claims, 7 Drawing Sheets

FIG. 7 PRIOR ART
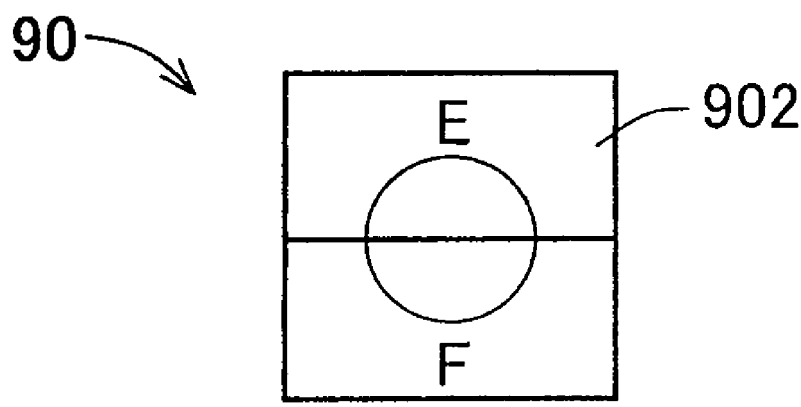
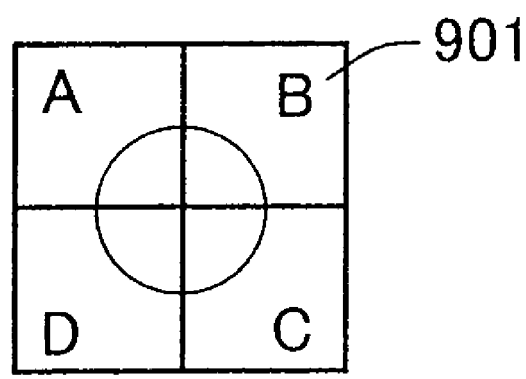
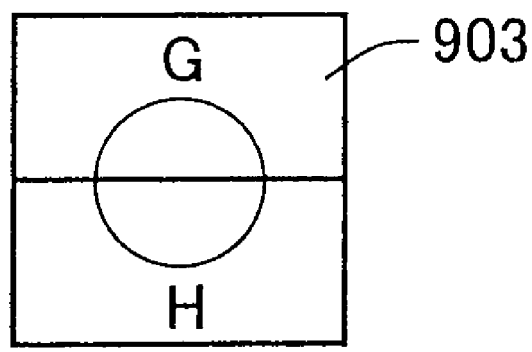

OPTICAL PICKUP APPARATUS, REPRODUCING APPARATUS, RECORDING APPARATUS, AND TRACKING ERROR SIGNAL GENERATION METHOD

CROSS-REFERENCE TO RELATED APPLICATION

This application claims priority to Japanese Patent Application No. 2008-029761, which was filed on Feb. 8, 2008, the contents of which are incorporated herein by reference in its entirety.

BACKGROUND OF THE INVENTION

1. Field of the Invention

The present invention relates to an optical pickup apparatus, a reproducing apparatus, a recording apparatus, and a tracking error signal generation method that are suitable for an optical recording medium formed of a plurality of recording layers.

2. Description of the Related Art

An optical disk recording/reproducing apparatus is designed to perform information recording or information reproduction by causing a spot of condensed light beams emitted from a laser light source to follow a track formed in a spiral fashion on an optical recording medium in advance such as an optical disk, for example, a signal track composed of guide grooves or pit arrays. As a method of exercising tracking control for causing a condensed light spot to follow the signal track, in general, a technique of detecting push-pull error signals is adopted (hereafter referred to as "push-pull detection method").

According to the push-pull detection method, reflected light that has undergone diffraction due to the configuration of guide grooves is detected by using a four-part split light-receiving element having four light-receiving regions obtained by dividing the entire area into two segments both in the direction of the tangent and in the direction of normal to the track of the optical disk, and intensity distribution of interference between zeroth-order diffraction light (hereafter referred to as "main beam") and ±first-order diffraction light (hereafter referred to as "sub beam") is detected to thereby generate a tracking error signal.

For example, in a tracking error detecting system of an optical head taken up as a first related art, three pieces of two-part split detectors are used, namely one two-part split detector for detecting a reflection beam obtained as the result of reflection of a main beam from an optical disk (hereafter referred to as "return light") and two two-part split detectors for detecting return light of a sub beam. A differential output obtained by amplifying a difference between two outputs from the two-part split detector for the main beam in a differential amplifier is corrected with differential outputs obtained by amplifying a difference between two outputs from each of the two-part split detectors for the two sub beams in a corresponding differential amplifier, and is eventually detected as a push-pull error signal, namely a tracking error signal (refer to Japanese Unexamined Patent Publication JP-A 61-94246 (1986), for example).

The method of detecting push-pull error signals adopted in the first related art is a differential push-pull detection method. In this method, a differential push-pull error signal is detected by subtracting, from the differential output detected in respect of the main beam (hereafter referred to as "push-pull signal"), a value obtained by multiplying the sum of push-pull signals detected in respect of the two sub beams by a certain coefficient. By adopting the differential push-pull detection method, it is possible to alleviate the influences of light quantity variation in push-pull error signals, lens offset, and disk tilting.

FIG. 7 is a view showing the configuration of a photodetector 90 in accordance with a second related art. The photodetector 90 of the second related art is composed of a four-part split light-receiving element 901 for detecting return light of a main beam and two two-part split light-receiving elements 902 and 903 for detecting return light of a sub beam. The four-part split light-receiving element 901 is formed of four regions A through D, the two-part split light-receiving element 902 is formed of two regions E and F, and the two-part split light-receiving element 903 is formed of two regions G and H.

In the example shown in FIG. 7, a differential push-pull error signal is detected by subtracting, from a push-pull signal detected in respect of the main beam '(output from the region A+output from the region B)−(output from the region C+output from the region D)', a value obtained by multiplying the sum of push-pull signals detected in respect of the two sub beams (output from the region E−output from the region F) and (output from the region G−output from the region H), namely [(output from the region E−output from the region F)+(output from the region G−output from the region H)] by a certain coefficient.

In general, an optical disk recording/reproducing apparatus using main and sub beams is so designed that the intensity ratio between a main beam and a sub beam is approximately 10:1. In the case of setting the intensity ratio between a main beam and a sub beam to be approximately 10:1, the following problem arises when recording or reproduction is effected on an optical disk having a plurality of recording layers, such as a two-layer disk. For example, in a case where, in a two-layer disk, a target recording layer to be accessed, namely a recording layer for effecting recording or reproduction is irradiated with a condensed light spot and resultant return light is used for signal reproduction, reflected light from the other recording layer which is not an access target (hereafter referred to as "stray light") is inconveniently detected by a light-receiving element.

Therefore, in the course of differential push-pull error signal generation, in an AGC (Automatic Gain Control) circuit for converting differential push-pull error signals in accordance with disk reflectance and irradiation power developed during recording or reproduction, stray light of the main beam is detected by the light-receiving element for the sub beam. This leads to production of incorrect differential push-pull error signals. In the presence of incorrect differential push-pull error signals, tracking control cannot be exercised in an appropriate manner, which gives rise to a problem of deterioration in servo performance capability.

In the optical disk apparatus taken up as a third related art, in addition to the first light detecting section for detecting reflected light from one of information recording layers, the second light detecting section formed of one or more light-receiving surfaces for detecting stray light from the other information recording layer is mounted on a light-receiving element. Based on the intensity of stray light detected by the second light detecting section, the number of information recording layers laminated on the optical disk is identified. In accordance with the identified information recording layer number, optical pickup control is exercised prior to focus servo control (refer to Japanese Unexamined Patent Publication JP-A 2006-31773, for example).

In the optical head apparatus taken up as the fourth prior art, in addition to the first light-receiving element section for obtaining push-pull signals of zeroth-order diffraction light and the second light-receiving element section for obtaining push-pull signals of ±first-order diffraction light, as the third light-receiving element section, a light-receiving element section for detecting interlayer stray light components, namely stray light components is provided. The first light-receiving element section is a four-part split detecting element, and the second light-receiving element sections, which are two in number, are each a two-part split detecting element. The configurations of the first and second light-receiving element sections are just as in FIG. 7. The third light-receiving element sections are two pairs of detecting elements, of which the detecting elements of each pair are individually placed in the vicinity of either side of their respective two-part split detecting element. In this construction, with use of a signal generated by subtracting, from the sum of signals outputted from the second light-receiving element sections, a signal value obtained by multiplying the detection signal outputted from the third light-receiving element section, namely stray-light component signal by a certain coefficient, stray light components included in the push-pull signal obtained by the second light-receiving element section are removed. In this way, it is possible to diminish the likelihood of calculation of differential push-pull error signals being carried out incorrectly (refer to Japanese Unexamined Patent Publication JP-A 2005-346882, for example).

However, the third related art, although it allows detection of stray light by means of the second light detecting section, is not directed toward adjustment of the influence of detected stray light exerted upon main-beam return light and sub-beam return light.

According to the fourth related art, a differential push-pull error signal, namely a tracking error signal is generated under a condition where interlayer stray light beams are uniform in intensity. That is, the fourth related art is based upon a case where stray light beams having uniform intensity exist on the third light-receiving element section and the second light-receiving element section. In reality, however, the intensity of interlayer stray light is not uniform throughout the region; that is, the stray-light intensity varies from part to part. This makes it impossible to remove stray light components included in sub-beam return light properly, with the result that calculation of differential push-pull error signals, namely tracking error signals is carried out incorrectly.

SUMMARY OF THE INVENTION

An object of the invention is to provide an optical pickup apparatus, a reproducing apparatus, a recording apparatus, and a tracking error signal generation method that allow stabilization of tracking control while diminishing the likelihood of tracking error signal calculation being carried out incorrectly due to the presence of two-dimensionally diffusible stray light components in the course of recording or reproduction effected on an optical disk formed of a plurality of recording layers.

The invention provides an optical pickup apparatus comprising:

a light source for emitting light;

a light-receiving section for receiving light and converting an optical signal included in the received light into an electrical signal; and an optical system that generates a main beam of zeroth-order diffraction light and sub beams of + first-order diffraction light and − first-order diffraction light by diffracting light emitted from the light source, applies the resultant main and sub beams to one of a plurality of recording layers constituting an optical recording medium, and directs reflected light from the optical recording medium toward the light-receiving section, the light-receiving section including:

a first light-receiving element having four regions divided by a straight line extending in a direction of a tangent to a track formed on the optical recording medium and a straight line extending in a direction of a normal to the track, for receiving main-beam reflected light;

a second light-receiving element and a third light-receiving element which are disposed individually on either side of the first light-receiving element in the direction of the normal and each have two regions divided by the straight line extending in the direction of the tangent, for receiving sub-beam reflected light;

a fourth light-receiving element disposed between the first light-receiving element and the second light-receiving element, for receiving stray light reflected from, out of the plurality of recording layers, the one other than the recording layer irradiated with the main and sub beams;

a fifth light-receiving element disposed between the first light-receiving element and the third light-receiving element, for receiving the stray light; and a sixth light-receiving element and a seventh light-receiving element disposed individually on either side of the first light-receiving element in the direction of the tangent, for receiving the stray light.

In the invention, it is preferable that the fourth light-receiving element and the fifth light-receiving element are so positioned that a distance between the first light-receiving element and the fourth light-receiving element differs from a distance between the first light-receiving element and the fifth light-receiving element.

In the invention, it is preferable that the sixth light-receiving element and the seventh light-receiving element are so positioned that a distance between the first light-receiving element and the sixth light-receiving element differs from a distance between the first light-receiving element and the seventh light-receiving element.

In the invention, it is preferable that light-receiving surfaces of the respective fourth to seventh light-receiving elements have a same area.

The invention provides a reproducing apparatus for reproducing information recorded on an optical recording medium formed of a plurality of recording layers, comprising:

the optical pickup apparatus mentioned above;

a signal generating section for generating, based on electrical signals obtained through conversion by the light-receiving section of the optical pickup apparatus, a focus error signal for bringing light applied to the optical recording medium into focus on the recording layer, a tracking error signal for aligning a focal point of the light applied to the optical recording medium with a track, and an information signal indicative of information read out from the optical recording medium;

a reproduction processing section for converting the information signal generated by the signal generating section into digital information; and a shifting section for shifting a location of the optical pickup apparatus, based on the focus error signal and the tracking error signal generated by the signal generating section, in such a manner that light applied to the optical recording medium by the optical pickup apparatus can be brought into focus on the recording layer and a focal point of the light can be aligned with the track, the signal generating section generating the tracking error signal, based on electrical signals obtained through conversion in the first to seventh light-receiving elements of the light-receiving section, by using a differential push-pull detection method.

In the invention, it is preferable that the signal generating section generates a first push-pull signal corresponding to main-beam reflected light based on four electrical signals obtained through conversion of light received by the four regions of the first light-receiving element, respectively, the signal generating section generates a second push-pull signal and a third push-pull signal corresponding to sub-beam reflected light based on two electrical signals obtained through conversion of light received by the two regions of the second light-receiving element, respectively, as well as two electrical signals obtained through conversion of light received by the two regions of the third light-receiving element, respectively, the signal generating section generates correction signals for correcting the second push-pull signal and the third push-pull signal, respectively, based on four electrical signals obtained through conversion of light received by the fourth to seventh light-receiving elements, respectively, and the signal generating section corrects the second push-pull signal and the third push-pull signal individually with the resultant correction signals and then generates the tracking error signal based on the corrected second and third push-pull signals.

In the invention, it is preferable that the signal generating section calculates intensity distribution of the stray light based on the four electrical signals obtained through conversion of light received by the fourth to seventh light-receiving elements, respectively, and generates correction signals corresponding to the locations of the second light-receiving element and the third light-receiving element, respectively, based on the calculated intensity distribution.

The invention provides a recording apparatus for recording information on an optical recording medium formed of a plurality of recording layers, comprising:

the optical pickup apparatus mentioned above;

a signal generating section for generating, based on electrical signals obtained through conversion by the light-receiving section of the optical pickup apparatus, a focus error signal for bringing light applied to the optical recording medium into focus on the recording layer, a tracking error signal for aligning a focal point of the light applied to the optical recording medium with a track, and an information signal indicative of information read out from the optical recording medium;

a reproduction processing section for converting the information signal generated by the signal generating section into digital information; and a shifting section for shifting a location of the optical pickup apparatus, based on the focus error signal and the tracking error signal generated by the signal generating section, in such a manner that light applied to the optical recording medium by the optical pickup apparatus can be brought into focus on the recording layer and a focal point of the light can be aligned with the track, the signal generating section generating the tracking error signal, based on electrical signals obtained through conversion in the first to seventh light-receiving elements of the light-receiving section, by using a differential push-pull detection method.

In the invention, it is preferable that the signal generating section generates a first push-pull signal corresponding to main-beam reflected light based on four electrical signals obtained through conversion of light received by the four regions of the first light-receiving element, respectively, the signal generating section generates a second push-pull signal and a third push-pull signal corresponding to sub-beam reflected light based on two electrical signals obtained through conversion of light received by the two regions of the second light-receiving element, respectively, as well as two electrical signals obtained through conversion of light received by the two regions of the third light-receiving element, respectively, the signal generating section generates correction signals for correcting the second push-pull signal and the third push-pull signal, respectively, based on four electrical signals obtained through conversion of light received by the fourth to seventh light-receiving elements, respectively, and the signal generating section corrects the second push-pull signal and the third push-pull signal individually with the resultant correction signals and then generates the tracking error signal based on the corrected second and third push-pull signals.

In the invention, it is preferable that the signal generating section calculates intensity distribution of the stray light based on the four electrical signals obtained through conversion of light received by the fourth to seventh light-receiving elements, respectively, and generates correction signals corresponding to the locations of the second light-receiving element and the third light-receiving element, respectively, based on the calculated intensity distribution.

The invention provides a tracking error signal generation method for generating tracking error signals for use in the reproducing apparatus mentioned above or the recording apparatus mentioned above, comprising:

a first push-pull signal generation step of generating a first push-pull signal corresponding to main-beam reflected light based on four electrical signals obtained through conversion of light received by the four regions of the first light-receiving element, respectively;

a second and third push-pull signal generation step of generating a second push-pull signal and a third push-pull signal corresponding to sub-beam reflected light based on two electrical signals obtained through conversion of light received by the two regions of the second light-receiving element, respectively, as well as two electrical signals obtained through conversion of light received by the two regions of the third light-receiving element, respectively;

a correction signal generation step of generating correction signals for correcting the second push-pull signal and the third push-pull signal, respectively, based on four electrical signals obtained through conversion of light received by the fourth to seventh light-receiving elements, respectively;

a correction step of correcting the second push-pull signal and the third push-pull signal generated in the second and third push-pull signal generation step individually with the correction signals generated in the correction signal generation step; and a generation step of generating the tracking error signal, based on the second push-pull signal and the third push-pull signal corrected in the correction step, by using a differential push-pull detection method.

According to the invention, light is emitted from the light source, and the light-receiving section receives the light and converts an optical signal included in the received light into an electrical signal. Moreover, the optical system generates a main beam of zeroth-order diffraction light and sub beams of + first-order diffraction light and − first-order diffraction light by diffracting the light emitted from the light source, applies the resultant main and sub beams to one of a plurality of recording layers constituting the optical recording medium, and directs the reflected light from the optical recording medium toward the light-receiving section.

The light-receiving section includes the first to seventh light-receiving elements. The first light-receiving element has four regions divided by the straight line extending in the direction of the tangent to the track formed on the optical recording medium and the straight line extending in the direction of the normal to the track. Main-beam reflected light is received by the first light-receiving element. The second light-receiving element and the third light-receiving element are disposed individually on either side of the first light-receiving element in the direction of the normal, of which each has two regions divided by the straight line extending in the direction of the tangent. Sub-beam reflected light is received by the second and third light-receiving elements.

The fourth light-receiving element is disposed between the first light-receiving element and the second light-receiving element to receive stray light reflected from, out of the plurality of recording layers, the one other than the recording layer irradiated with the main and sub beams. The fifth light-receiving element is disposed between the first light-receiving element and the third light-receiving element to receive the stray light. The sixth light-receiving element and the seventh light-receiving element are disposed individually on either side of the first light-receiving element in the direction of the tangent. The stray light is received by the sixth and seventh light-receiving elements.

Accordingly, by using the optical pickup apparatus of the invention, it is possible to produce output of electrical signals obtained through conversion of stray light received by the fourth to seventh light-receiving elements, respectively. Based on the electrical signals, it is possible to remove stray light components from electrical signals obtained through conversion of light received by the second light-receiving element and the third light-receiving element, respectively. That is, a tracking error signal can be generated on the basis of a push-pull signal corresponding to a sub beam with stray light components removed. Expressed differently, in the course of recording or reproduction effected on the optical disk formed of a plurality of recording layers, it is possible to diminish the likelihood of tracking error signal calculation being carried out incorrectly due to the presence of two-dimensionally diffusible stray light components, and thereby achieve stabilization of tracking control.

According to the invention, in order to reproduce information recorded on the optical recording medium formed of a plurality of recording layers, based on the electrical signals obtained through conversion by the light-receiving section of the optical pickup apparatus, a focus error signal for bringing the light applied to the optical recording medium into focus on the recording layer, a tracking error signal for aligning the focal point of the light applied to the optical recording medium with the track, and an information signal indicative of information read out from the optical recording medium are generated by the signal generating section. Moreover, the information signal generated by the signal generating section is converted into digital information by the reproduction processing section.

Further, based on the focus error signal and the tracking error signal generated by the signal generating section, the location of the optical pickup apparatus is shifted by the shifting section in such a manner that the light applied to the optical recording medium by the optical pickup apparatus can be brought into focus on the recording layer and the focal point of the light can be aligned with the track. Then, the tracking error signal is generated by the signal generating section on the basis of the electrical signals obtained through conversion in the first to seventh light-receiving elements of the light-receiving section, respectively, by using the differential push-pull detection method.

Accordingly, in the case of using the reproducing apparatus according to the invention, it is possible to produce output of electrical signals obtained through conversion of stray light received by the fourth to seventh light-receiving elements, respectively. Based on the electrical signals, stray light components can be removed from electrical signals obtained through conversion of light received by the second light-receiving element and the third light-receiving element, respectively. That is, a tracking error signal can be generated on the basis of a push-pull signal corresponding to a sub beam with stray light components removed. Expressed differently, in the course of reproduction effected on the optical disk formed of a plurality of recording layers, it is possible to diminish the likelihood of tracking error signal calculation being carried out incorrectly due to the presence of two-dimensionally diffusible stray light components, and thereby achieve stabilization of tracking control.

According to the invention, in order to record information on the optical recording medium formed of a plurality of recording layers, based on the electrical signals obtained through conversion by the light-receiving section of the optical pickup apparatus, a focus error signal for bringing the light applied to the optical recording medium into focus on the recording layer, a tracking error signal for aligning the focal point of the light applied to the optical recording medium with the track, and an information signal indicative of information read out from the optical recording medium are generated by the signal generating section. Moreover, the information signal generated by the signal generating section is converted into digital information by the reproduction processing section.

Further, based on the focus error signal and the tracking error signal generated by the signal generating section, the location of the optical pickup apparatus is shifted by the shifting section in such a manner that the light applied to the optical recording medium by the optical pickup apparatus can be brought into focus on the recording layer and the focal point of the light can be aligned with the track. Then, the tracking error signal is generated by the signal generating section on the basis of the electrical signals obtained through conversion in the first to seventh light-receiving elements of the light-receiving section, respectively, by using the differential push-pull detection method.

Accordingly, in the case of using the recording apparatus according to the invention, it is possible to produce output of electrical signals obtained through conversion of stray light received by the fourth to seventh light-receiving elements, respectively. Based on the electrical signals, stray light components can be removed from electrical signals obtained through conversion of light received by the second light-receiving element and the third light-receiving element, respectively. That is, a tracking error signal can be generated on the basis of a push-pull signal corresponding to a sub beam with stray light components removed. Expressed differently, in the course of recording effected on the optical disk formed of a plurality of recording layers, it is possible to diminish the likelihood of tracking error signal calculation being carried out incorrectly due to the presence of two-dimensionally diffusible stray light components, and thereby achieve stabilization of tracking control.

According to the invention, in order to generate tracking error signals for use in the reproducing apparatus or the recording apparatus, in the first push-pull signal generation step, based on the four electrical signals obtained through conversion of light received by the four regions of the first light-receiving element, respectively, the first push-pull signal corresponding to main-beam reflected light is generated. In the second and third push-pull signal generation step, based on the two electrical signals obtained through conversion of light received by the two regions of the second light-receiving element, respectively, as well as the two electrical signals obtained through conversion of light received by the two regions of the third light-receiving element, respectively, the second and third push-pull signals corresponding to sub-beam reflected light are generated.

In the correction signal generation step, based on the four electrical signals obtained through conversion of light received by the fourth to seventh light-receiving elements, respectively, correction signals for correcting the second push-pull signal and the third push-pull signal, respectively, are generated. In the correction step, the second and third push-pull signals generated in the second and third push-pull signal generation step are individually corrected with the correction signals generated in the correction signal generation step.

Lastly, in the generation step, based on the second and third push-pull signals corrected in the correction step, the tracking error signal is generated by using the differential push-pull detection method.

Accordingly, with the application of the tracking error signal generation method of the invention, it is possible to produce output of electrical signals obtained through conversion of stray light received by the fourth to seventh light-receiving elements, respectively. Based on the electrical signals, stray light components can be removed from electrical signals obtained, through conversion of light received by the second and third light-receiving elements. That is, a tracking error signal can be generated on the basis of a push-pull signal corresponding to a sub beam with stray light components removed. Expressed differently, in the course of recording or reproduction effected on the optical disk formed of a plurality of recording layers, it is possible to diminish the likelihood of tracking error signal calculation being carried out incorrectly due to the presence of two-dimensionally diffusible stray light components, and thereby achieve stabilization of tracking control.

BRIEF DESCRIPTION OF THE DRAWINGS

Other and further objects, features, and advantages of the invention will be more explicit from the following detailed description taken with reference to the drawings wherein:

FIG. 7 is a view showing the configuration of the photodetector in accordance with the second related art.

DETAILED DESCRIPTION

Figure 1:
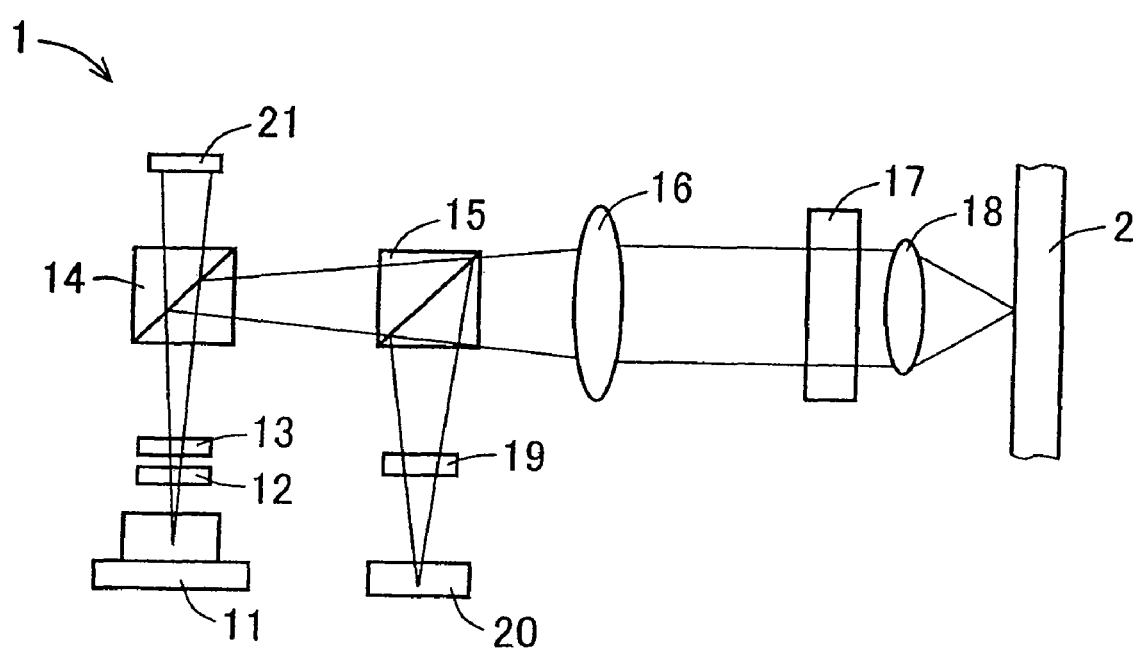
FIG. 1 is a block diagram showing the structure of an optical pickup apparatus in accordance with one embodiment of the invention.

Now referring to the drawings, preferred embodiments of the invention will be described in detail.

FIG. 1 is a block diagram showing the structure of an optical pickup apparatus 1 in accordance with one embodiment of the invention. The optical pickup apparatus 1 is composed of a semiconductor laser 11, a λ/2 wavelength plate 12, a diffraction grating 13, a diffractive beam splitter 14, a polarized beam splitter 15, a collimator lens 16, a λ/4 wavelength plate 17, an objective lens 18, a cylindrical lens 19, a photodetector 20, and a monitoring photodiode 21.

An optical disk 2 is an optical recording medium in which information is recordable on or reproducible from a plurality of recording layers with light. The examples thereof include DVD-ROM (Digital Versatile Disk-Read Only Memory), DVD-R (Digital Versatile Disk-Recordable), DVD-RW (Digital Versatile Disk-ReWritable), DVD+R (Digital Versatile Disk+Recordable), DVD+RW (Digital Versatile Disk+ReWritable), BD (Blu-ray Disc), and HD-DVD (High Definition-Digital Versatile Disk).

The semiconductor laser 11 serving as a light source emits laser light. The λ/2 wavelength plate 12 turns the direction of polarization of the laser light emitted from the semiconductor laser 11 through 90°. The diffraction grating 13 diffracts the laser light passed through the λ/2 wavelength plate 12 to divide it into a main beam which is zeroth-order diffraction light and two sub beams that are + first-order diffraction light and − first-order diffraction light, respectively. The two sub beams are used for tracking error signal generation.

The diffractive beam splitter 14 allows part of the laser light diffracted from the diffraction grating 13 to pass therethrough without undergoing reflection and then emits it in the direction of the monitoring photodiode 21, and also allows the rest of the laser light to be reflected therefrom, so that the laser light makes a 90° turn in its traveling direction and exits in the direction of the polarized beam splitter 15. The polarized beam splitter 15 allows the laser light coming from the diffractive beam splitter 14 to pass therethrough without undergoing reflection, and also allows the light passed through the collimator lens 16 to be reflected therefrom, so that the light makes a 90° turn in its traveling direction and exits in the direction of the cylindrical lens 19.

The collimator lens 16 turns the laser light passed through the polarized beam splitter 15 into parallel light, and condenses the parallel light passed through the λ/4 wavelength plate 17 on the light-receiving surface of the photodetector 20 to thereby form a spot of condensed light. The λ/4 wavelength plate 17 converts the parallel light passed through the collimator lens 16 into circularly-polarized light, and also converts the parallel light passed through the objective lens into linearly-polarized light. The objective lens 18 condenses the parallel light passed through the λ/4 wavelength plate 17 on the recording layer of the optical disk 2 to thereby form a condensed light spot, and also turns the reflected light from the optical disk 2 into parallel light.

The cylindrical lens 19 corrects astigmatic aberration of the reflected light from the polarized beam splitter 15. The photodetector 20 serving as the light-receiving section is composed of a plurality of light-receiving elements that will be described in detail with reference to FIG. 2. Each of the light-receiving elements receives reflected light passed through the cylindrical lens 19, and converts an optical signal included in the reflected light into an electrical signal. The monitoring PD 21 converts an optical signal into an electrical signal for exercising laser power control.

The λ/2 wavelength plate 12, the diffraction grating 13, the diffractive beam splitter 14, the polarized beam splitter 15, the collimator lens 16, the λ/4 wavelength plate 17, the objective lens 18, and the cylindrical lens 19 are provided as an optical system.

Figure 2:
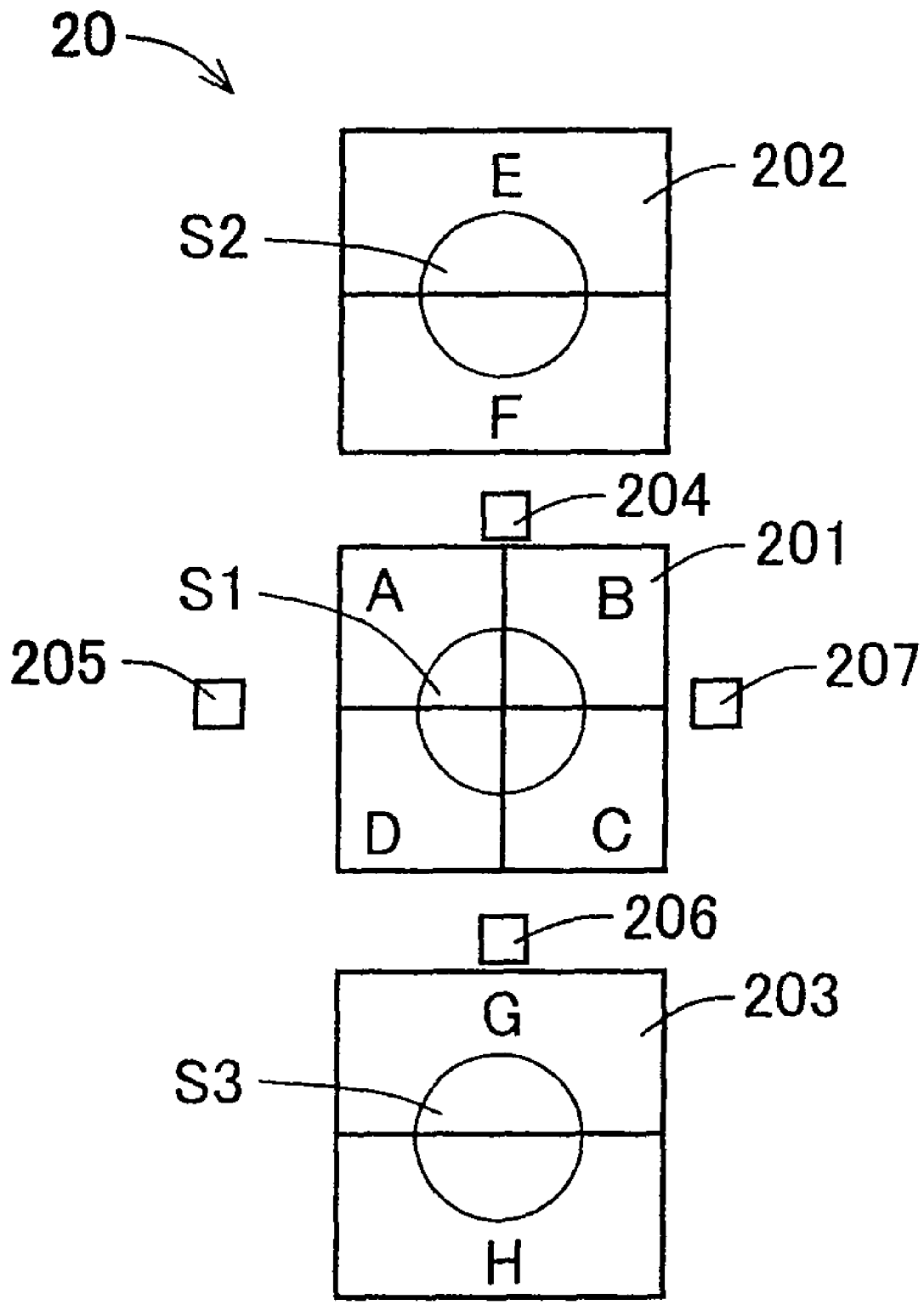
FIG. 2 is a view schematically showing the configuration of a photodetector.

FIG. 2 is a view schematically showing the configuration of the photodetector 20. The photodetector 20 is composed of a single four-part split light-receiving element 201, two pieces of two-part split light-receiving elements 202 and 203, and four pieces of light-receiving elements 204 to 207. For example, these light-receiving elements are each constructed of a photodiode.

The four-part split light-receiving element 201 defined as the first light-receiving element is formed of four regions A to D that are obtained by dividing the entire area by a straight line extending in the direction of the tangent to the track of the optical disk 2 and a straight line extending in the direction of the normal to the track of the optical disk 2. Each of the regions has broadband characteristics and converts light that it received into an electrical signal. The regions A and D, as well as the regions B and C, are adjacent to each other in the direction of the normal to the track, whereas the regions A and B, as well as the regions C and D, are adjacent to each other in the direction of the tangent to the track.

The two-part split light-receiving element 202 defined as the second light-receiving element is formed of two regions E and F that are obtained by dividing the entire area by a straight line extending in the direction of the tangent to the track of the optical disk 2. Each of the regions converts light that it received into an electrical signal. The two-part split light-receiving element 203 defined as the third light-receiving element is formed of two regions G and H that are obtained by dividing the entire area by a straight line extending in the direction of the tangent to the track of the optical disk 2. Each of the regions converts light that it received into an electrical signal. The two-part split light-receiving elements 202 and 203 are disposed along the direction of the normal to the track of the optical disk 2, with the four-part split light-receiving element 201 lying therebetween, so as to be individually located in the vicinity of either side of the four-part split light-receiving element 201.

The light-receiving element 204 defined as the fourth light-receiving element is disposed between the four-part split light-receiving element 201 and the two-part split light-receiving element 202. The light-receiving element 206 defined as the fifth light-receiving element is disposed between the four-part split light-receiving element 201 and the two-part split light-receiving element 203. The light-receiving element 204 and the light-receiving element 206 are so positioned that the distance between the light-receiving element 204 and the four-part split light-receiving element 201 differs from the distance between the light-receiving element 206 and the four-part split light-receiving element 201. In the example shown in FIG. 2, the light-receiving element 204 and the light-receiving element 206 are so positioned that the distance between the light-receiving element 206 and the four-part split light-receiving element 201 is greater than the distance between the light-receiving element 204 and the four-part split light-receiving element 201.

The light-receiving element 205 defined as the sixth light-receiving element and the light-receiving element 207 defined as the seventh light-receiving element are disposed along the direction of the tangent to the track of the optical disk 2, with the four-part split light-receiving element 201 lying therebetween, so as to be individually located in the vicinity of either side of the four-part split light-receiving element 201. The light-receiving element 205 and the light-receiving element 207 are so positioned that the distance between the light-receiving element 205 and the four-part split light-receiving element 201 differs from the distance between the light-receiving element 207 and the four-part split light-receiving element 201. In the example shown in FIG. 2, the light-receiving element 205 and the light-receiving element 207 are so positioned that the distance between the light-receiving element 205 and the four-part split light-receiving element 201 is greater than the distance between the light-receiving element 207 and the four-part split light-receiving element 201.

The four light-receiving elements 204 to 207 are provided to receive main-beam reflected light and sub-beam reflected light coming from, out of a plurality of recording layers of the optical disk 2, the one other than the recording layer for effecting recording or reproduction (hereafter referred to as "stray light" or "interlayer stray light"). The light-receiving surfaces of the respective four light-receiving elements 204 to 207 have the same area.

A light spot S1 is a spot of condensed reflected light of a main beam. A light spot S2 is a spot of condensed reflected light of a + first-order diffraction-light sub beam. A light spot S3 is a spot of condensed reflected light of a − first-order diffraction-light sub beam. That is, the main-beam reflected light is received by the four regions A to D of the four-part split light-receiving element 201, the reflected light of a + first-order diffraction-light sub beam is received by the two regions E and F of the two-part split light-receiving element 202, and the reflected light of a − first-order diffraction-light sub beam is received by the two regions G and H of the two-part split light-receiving element 203.

Figure 3:
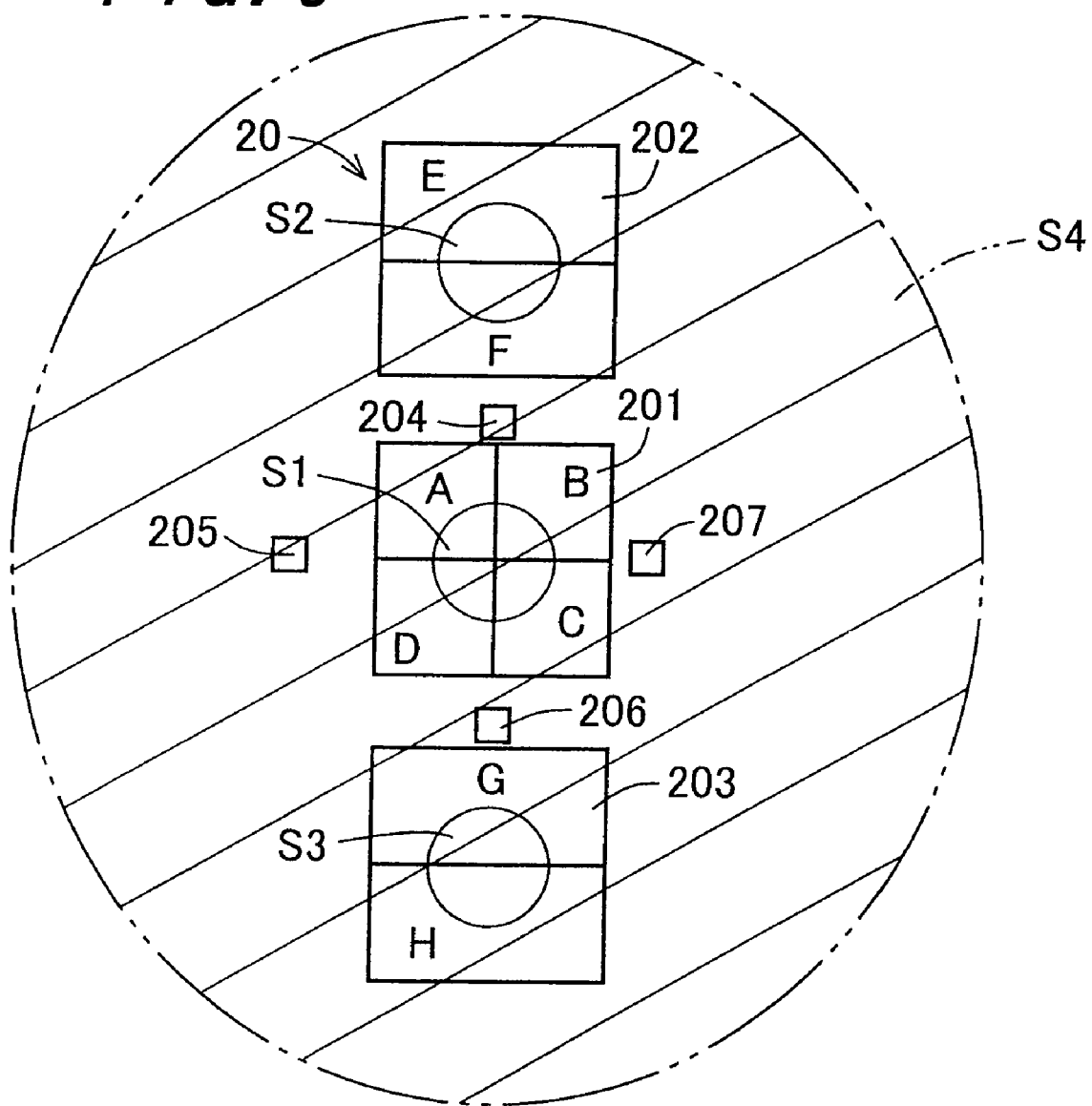
FIG. 3 is a view showing a range of stray light irradiation in relation to the photodetector.

FIG. 3 is a view showing a range S4 of stray light irradiation in relation to the photodetector 20. For example, assuming that the optical disk 2 is formed of two recording layers: an L0 layer and an L1 layer, of which the L0 layer is a recording layer for effecting recording or reproduction. In this case, on the photodetector 20, the reflected light of a main beam from the L0 layer is condensed as the light spot S1, and the reflected light of one of two sub beams from the L0 layer and the reflected light of the other sub beam are condensed as the light spot S2 and the light spot S3, respectively. In addition, the reflected light of a main beam from the L1 layer and the reflected light of a sub beam from the L1 layer are irradiated as stray light over a wide range S4. That is, the stray light originating from the L1 layer superposes itself on the main-beam reflected light received by the four-part split light-receiving element 201 and on the sub-beam reflected light received by the two two-part split light-receiving elements 202 and 203.

The stray light is lower in intensity than the reflected light from the L0 layer for effecting recording or reproduction. Therefore, the influence of the stray light of the main beam reflected from the L1 layer exerted on the reflected light of the main beam from the L0 layer, as well as the influence of the stray light of the sub beam reflected from the L1 layer exerted on the reflected light of the main beam from the L0 layer and on the reflected light of the sub beam from the L0 layer, will be negligible. However, given the intensity ratio between the main beam and the sub beam of 10:1, then the influence of the stray light of the main beam reflected from the L1 layer exerted on the reflected light of the sub beam from the L0 layer becomes 10 times greater than that exerted on the reflected light of the main beam from the L0 layer. In this case, the influence of the stray light has to be reckoned with. Furthermore, in a case where no information is recorded on the L1 layer, the intensity of the stray light is increased, with the result that the stray light exerts significant influence.

The stray-light range S4 takes the shape of an ellipse, the center of which corresponds to the four-part split light-receiving element 201. In general, the intensity of laser light distributes in conformity with Gaussian distribution, and so does the intensity of stray light. Accordingly, with the understanding of the positional relationship among the four-part split light-receiving element 201, the two two-part split light-receiving elements 202 and 203, and the four light-receiving elements 204 to 207, based on the magnitudes of the electrical signals obtained as the result of the conversion performed in the four light-receiving elements 204 to 207, the stray light intensity at each of the locations of the four light-receiving elements 204 to 207 is detected. In this way, it is possible to calculate the stray light intensity at each of the locations of the four-part split light-receiving element 201 and the two two-part split light-receiving elements 202 and 203.

In this case, the intensity distribution of the stray light in the direction of the tangent to the track is calculated on the basis of the electrical signals detected by the light-receiving elements 205 and 207, and the intensity distribution of the stray light in the direction of the normal to the track is calculated on the basis of the electrical signals detected by the light-receiving elements 204 and 206.

Under conditions where the center of the four-part split light-receiving element 201 is a point of origin (0,0), the direction of the tangent to the track is X-axis direction, and the direction of the normal to the track is Y-axis direction, then the intensity distribution $I_M$ of the stray light can be calculated from Equation (1).

$$I_M = I_{Mx0} \times \exp\left(-\frac{x^2}{\omega_x^2}\right) \times I_{My0} \times \exp\left(-\frac{y^2}{\omega_y^2}\right) \quad (1)$$

In the equation, $I_{Mx0}$ represents stray-light intensity distribution in the Y-axis direction, or the direction of the Y axis passing through the center of the four-part split light-receiving element 201, namely the direction of the normal to the track, and $I_{My0}$ represents stray-light intensity distribution in the X-axis direction, or the direction of the X axis passing through the center of the four-part split light-receiving element 201, namely the direction of the tangent to the track. Moreover, $\omega_x$ represents the size of a stray-light beam waist in the Y-axis direction, and $\omega_y$ represents the size of a stray-light beam waist in the X-axis direction. The beam waist is a spot of fundamental-mode Gaussian beam having a minimum beam diameter, the wavefront curvature of which is zero. By determining $I_{Mx0}$, $I_{My0}$, $\omega_x$, and $\omega_y$, it is possible to calculate stray-light intensity at given position.

Under conditions where the stray-light intensity levels detected by the light-receiving elements 204 to 207, respectively, are expressed as $I_4$, $I_5$, $I_6$, and $I_7$, respectively, then $\omega_x$ and $\omega_y$ can be calculated from Equations (2) and (3), respectively.

$$\omega_x^2 = \frac{d^2 - c^2}{\ln I_6 - \ln I_7} \quad (2)$$

$$\omega_y^2 = \frac{b^2 - a^2}{\ln I_4 - \ln I_5} \quad (3)$$

In the equations, 'a' represents a distance from the origin point to the center of the light-receiving element 204, 'b' represents a distance from the origin point to the center of the light-receiving element 206, 'c' represents a distance from the origin point to the center of the light-receiving element 205, and 'd' represents a distance from the origin point to the center of the light-receiving element 207. Accordingly, $\omega_x$ and $\omega_y$ can be calculated on the basis of the stray-light intensity levels detected by the light-receiving elements 204 to 207.

The stray-light intensity $I_{M0}$ at the origin point can be calculated from Equation (4) by making the following substitutions: X=0 and y=0 in Equation (1). That is, where 0 is substituted for x and y, respectively, in Equation (1), then the stray-light intensity $I_{M0}$ at the origin point is given as:

$$I_{M0} = I_{Mx0} \times I_{My0}$$

Then, by making the following substitutions: $I_M = I_1$, x=a, and y=0 in Equation (1), the following relationship is established:

$$I_1 = I_{Mx0} \times \exp(-a^2/\omega_x^2) \times I_{My0}$$

Then, with modifications to the above formula, Equation (4) holds.

$$I_{Mx0} \times I_{My0} = \frac{I_1}{\exp(-a^2/\omega_x^2)} = I_1 \times \exp(a^2/\omega_x^2) \quad (4)$$

By substituting $I_{M0}$, $\omega_x$, and $\omega_y$ derived from Equations (2) to (4) into Equation (1), stray-light intensity $I_M$ at given position can be calculated. That is, the following relationship is established:

$$I_M = I_{Mx} \times I_{My} \times \exp\left(\frac{x^2}{\omega_x^2}\right) \times \exp\left(\frac{y^2}{\omega_y^2}\right)$$

$$= I_{M0} \times \exp\left(\frac{x^2}{\omega_x^2}\right) \times \exp\left(\frac{y^2}{\omega_y^2}\right)$$

Based on Equation (1), the stray-light intensity, namely correction signal at each of the locations of the regions E to H of the two two-part split light-receiving elements 202 and 203 can be calculated from Equations (5) to (8), respectively:

$$I_{ME} = \int_{-e}^{e} \int_{g}^{g+f} I_M \, dx \, dy \quad (5)$$

$$I_{MF} = \int_{-e}^{e} \int_{g-f}^{g} I_M \, dx \, dy \quad (6)$$

$$I_{ME} = \int_{-e}^{e} \int_{g-f}^{g} I_M \, dx \, dy \quad (7)$$

$$I_{MF} = \int_{-e}^{e} \int_{g}^{g+f} I_M \, dx \, dy \quad (8)$$

Figure 4:
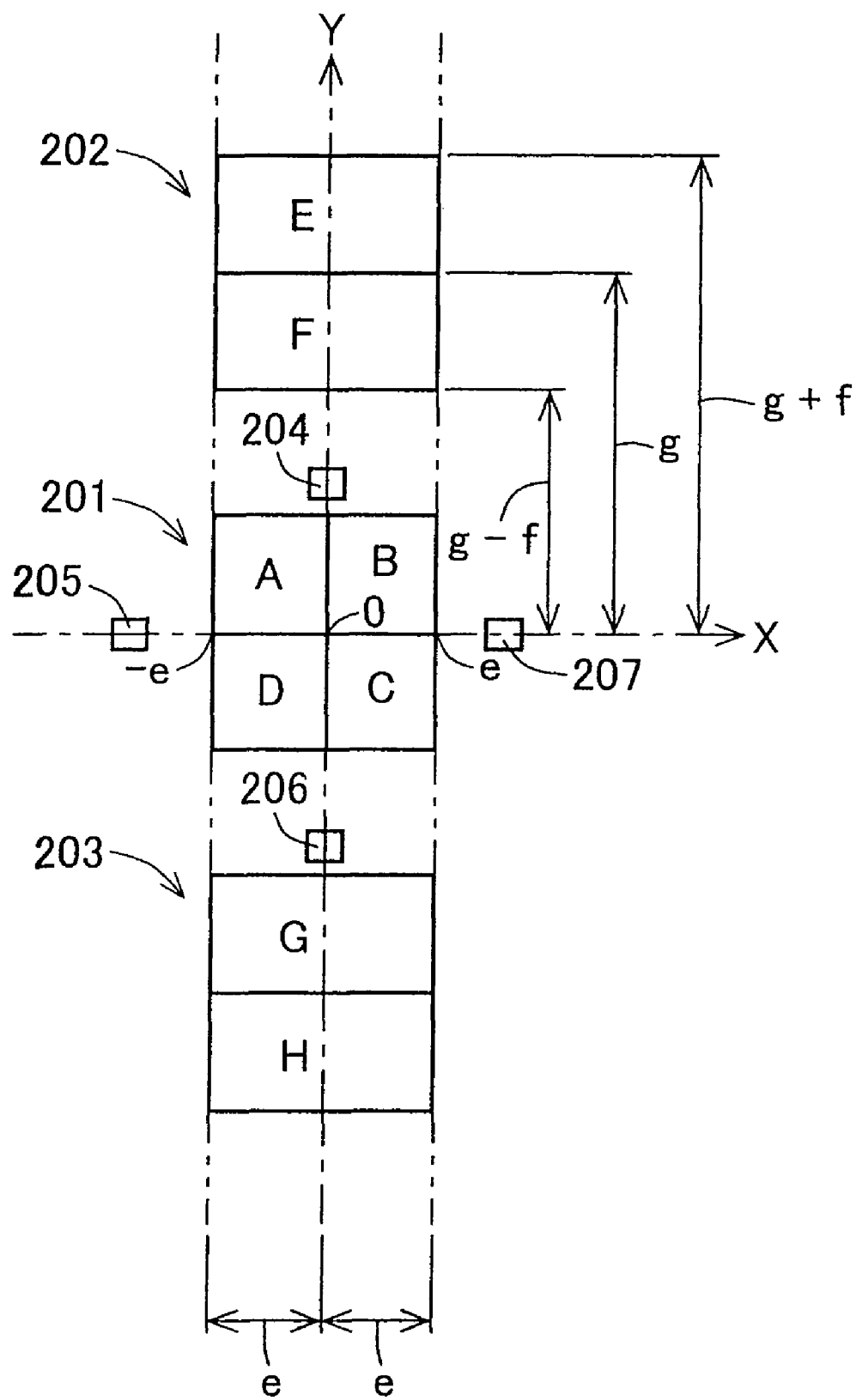
FIG. 4 is a view for explaining variables 'e' to 'g' for use in Equations (5) to (8)

FIG. 4 is a view for explaining variables 'e' to 'g' for use in Equations (5) to (8). Under conditions where the straight line extending in the direction of the tangent to the track of the optical disk 2 and the straight line extending in the direction of the normal to the track of the optical disk 2 for dividing the four-part split light-receiving element 201 into the four regions A to D are defined as X axis and Y axis, respectively, then the variable 'e' represents the width of the region A as well as the region B in the X-axis direction. The position of the X coordinate of, out of the two sides of the region B in the Y-axis direction, the one closer to the light-receiving element 207, is represented by [e], and the position of the X coordinate of, out of the two sides of the region A in the Y-axis direction, the one closer to the light-receiving element 205, is represented by [−e]. The variable 'f' represents the width of the region E as well as the region F of the two-part split lightreceiving element 202 in the Y-axis direction. The variable 'g' represents a distance from the X axis to the boundary between the regions E and F of the two-part split light-receiving element 202. Correspondingly, the position of the Y coordinate of, out of the two sides of the region E in the X-axis direction, the one farthest away from the X axis, is represented by [g+ f], and the position of the Y coordinate of, out of the two sides of the region F in the X-axis direction, the one closer to the light-receiving element 204, is represented by [g− f].

Thus, in this construction, light is emitted from the semiconductor laser 11, and the photodetector 20 receives the light and converts an optical signal included in the received light into an electrical signal. Through the λ/2 wavelength plate 12, the diffraction grating 13, the diffractive beam splitter 14, the polarized beam splitter 15, the collimator lens 16, the λ/4 wavelength plate 17, the objective lens 18, and the cylindrical lens 19, the light emitted from the semiconductor laser 11 is subjected to diffraction to thereby generate a main beam of zeroth-order diffraction light and sub beams of +first-order diffraction light and −first-order diffraction light. Then, in the optical disk 2 having a plurality of recording layers, the resultant main and sub beams are applied to one of a plurality of the recording layers. The reflected light from the optical recording medium is directed to the photodetector 20.

The photodetector 20 includes the four-part split light-receiving element 201, the two-part split light-receiving elements 202 and 203, and the light-receiving elements 204 to 207. The four-part split light-receiving element 201, which has four regions divided by the straight line extending in the direction of the tangent to the track formed in the optical disk 2 and the straight line extending in the direction of the normal to the track, receives main-beam reflected light. Moreover, the two-part split light-receiving elements 202 and 203 disposed individually on either side of the four-part split light-receiving element 201 in the direction of the normal, of which each has two regions divided by the straight line extending in the direction of the tangent, receives sub-beam reflected light.

Further, the light-receiving element 204 disposed between the four-part split light-receiving element 201 and the two-part split light-receiving element 202 receives stray light reflected from, out of a plurality of the recording layers, the one other than the recording layer irradiated with the main and sub beams. Likewise, the light-receiving element 206 disposed between the four-part split light-receiving element 201 and the two-part split light-receiving element 203 receives the stray light, and the light-receiving elements 205 and 207 disposed individually on either side of the four-part split light-receiving element 201 in the direction of the tangent receive the stray light.

Accordingly, with use of the optical pickup apparatus 1 according to the invention, stray light is received by the light-receiving elements 204 to 207, and, through conversion process, output of electrical signals can be produced therefrom. Based on the electrical signals, it is possible to remove stray light components from electrical signals obtained through conversion of light received by the two-part split light-receiving elements 202 and 203. That is, a tracking error signal can be generated on the basis of a push-pull signal corresponding to the sub beam with stray light components removed. Expressed differently, in the course of recording or reproduction effected on the optical disk 2 formed of a plurality of recording layers, it is possible to diminish the likelihood of tracking error signal calculation being carried out incorrectly due to the presence of two-dimensionally diffusible stray light components, and thereby achieve stabilization of tracking control.

Moreover, the light-receiving element 204 and the light-receiving element 206 are so positioned that the distance between the light-receiving element 204 and the four-part split light-receiving element 201 differs from the distance between the light-receiving element 206 and the four-part split light-receiving element 201. This makes it possible, by exploiting the fact that the intensity distribution of stray light conforms to Gaussian distribution, to calculate intensity distribution in the direction of the normal to the track.

Further, the light-receiving element 205 and the light-receiving element 207 are so positioned that the distance between the light-receiving element 205 and the four-part split light-receiving element 201 differs from the distance between the light-receiving element 207 and the four-part split light-receiving element 201. This makes it possible, by exploiting the fact that the intensity distribution of stray light conforms to Gaussian distribution, to calculate intensity distribution in the direction of the tangent to the track.

In addition, light-receiving surfaces of the respective light-receiving elements 204 to 207 have the same area. Accordingly, in calculating a correction signal for correcting a push-pull signal corresponding to the sub beam, the electrical signals obtained through conversion of stray light received by the light-receiving elements 204 to 207 can be used as they are without the necessity of conducting conversion as to difference in area. This helps facilitate the calculation.

Figure 5:
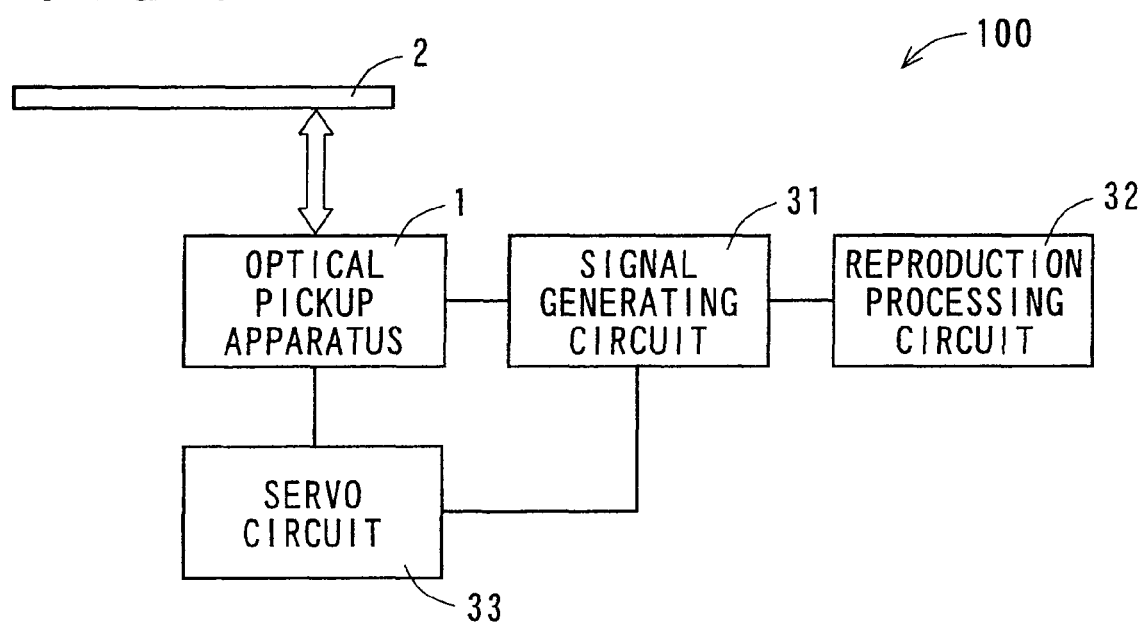
FIG. 5 is a block diagram schematically showing the configuration of a reproducing apparatus in accordance with one embodiment of the invention.

FIG. 5 is a block diagram schematically showing the configuration of a reproducing apparatus 100 in accordance with one embodiment of the invention. The tracking error signal generation method according to the invention is executed in the reproducing apparatus 100. The reproducing apparatus 100 is an apparatus for reproducing information recorded on the optical disk 2, and is composed of an optical pickup apparatus 1, a signal generating circuit 31, a reproduction processing circuit 32, and a servo circuit 33.

The optical pickup apparatus 1 is the optical pickup apparatus shown in FIG. 1. The signal generating circuit 31 serving as a signal generating section generates, based on the electrical signals obtained through conversion by the photodetector 20 of the optical pickup apparatus 1, a focus error signal for bringing the laser light applied to the optical disk 2 into focus on the recording layer, a tracking error signal for aligning the focal point of the laser light applied to the optical disk 2 with the track, and an information signal indicative of information read out from the optical disk 2.

The reproduction processing circuit 32 serving as a reproduction processing section converts the information signal generated by the signal generating circuit 31 into digital information. The servo circuit 33 serving as a shifting section shifts, based on the focus error signal and tracking error signal generated by the signal generating circuit 31, the location of the optical pickup apparatus 1 in such a manner that the laser light applied to the optical disk 2 by the optical pickup apparatus 1 can be brought into focus on the recording layer and the focal point of the laser light can be aligned with the track.

The signal generating circuit 31 generates focus error signals by using the astigmatic method and generates tracking error signals (hereafter also referred to as "differential push-pull error signals") by using the phase difference method and the differential push-pull detection method. The phase difference method is employed for example in the tracking control circuit of the optical digital disk player disclosed in Japanese Unexamined Patent Publication JP-A 58-150145 (1983), and the differential push-pull detection method is employed for example in the tracking error detecting system of the optical head disclosed in Japanese Unexamined Patent Publication JP-A 61-94246 (1986).

The signal generating circuit 31 amplifies the electrical signals obtained through conversion in the light-receiving elements of the photodetector 20, and calculates, based on the amplified electrical signals, a push-pull signal MPP corresponding to reflected light of the main beam, a push-pull signal SPP1 corresponding to reflected light of the sub beam of + first-order diffraction light, and a push-pull signal SPP2 corresponding to reflected light of the sub beam of -first-order diffraction light.

The push-pull signal MPP, the push-pull signal SPP1, and the push-pull signal SPP2 that are a first push-pull signal, a second push-pull signal, and a third push-pull signal, respectively, can be calculated from Equations (9) to (11), respectively.

$$MPP=(SA+SB)-(SC+SD) \quad (9)$$

$$SPP1=SE-SF \quad (10)$$

$$SPP2=SG-SH \quad (11)$$

In Equations (9) to (11), SA through SH represent output values of the electrical signals obtained through conversion in the regions A to D of the four-part split light-receiving element, the regions E and F of the two-part split light-receiving element 202, and the regions G and H of the two-part split light-receiving element 203, respectively, that have been amplified by the signal generating circuit 31.

A differential push-pull error signal DPP is calculated from Equation (12) wherein k represents a coefficient.

$$DPP=MPP-k\times(SPP1+SPP2) \quad (12)$$

The differential push-pull error signal DPP arises through the spot of condensed light applied to the recording layer being subjected to diffractive reflection due to the track formed on the optical disk 2, for example, guide grooves or pit arrays.

Equations (10) and (11) representing the push-pull signal SPP1 and the push-pull signal SPP2, respectively, were formulated with no regard given to the influence of stray light. Therefore, in order to remove stray light components in consideration of the influence of stray light, $I_{ME}$, $I_{MF}$, $I_{MG}$, and $I_{MH}$ representing correction signals calculated from Equations (5) to (8) are substituted into Equations (13) and (14), and then the push-pull signal SPP1 and the push-pull signal SPP2 are obtained by calculation.

$$SPP1=(E-I_{ME})-(F-I_{MF}) \quad (13)$$

$$SPP2=(G-I_{MG})-(H-I_{MH}) \quad (14)$$

The differential push-pull error signal DPP generated by the signal generating circuit 31 is sent to the servo circuit 33. Based on the tracking error signal received from the signal generating circuit 31, the servo circuit 33 shifts the location of the optical pickup apparatus 1 in such a manner that the light spot of the light beam applied to the recording layer of the optical disk 2 can be aligned with the track.

Since this differential push-pull error signal DPP, namely tracking error signal is free from stray light components, it is possible to reduce errors in the tracking error signal resulting from stray light during information reproduction effected on the optical disk 2 formed of a plurality of recording layers. Accordingly, with use of the differential push-pull detection method, tracking control can be exercised accurately over the optical disk 2 formed of two or more recording layers, and it is possible to achieve reliable tracking control against deviation in the field of view of the objective lens 18, namely the shifting of the objective lens 18 in a direction radially of the optical disk 2. In the related arts, proper differential push-pull method cannot be applied to the optical disk 2 formed of two or more recording layers due to the presence of stray light. By way of contrast, according to the invention, a proper differential push-pull signal can be generated even for the optical disk 2 formed of two or more recording layers, wherefore reliable tracking control can be achieved.

Thus, in order to reproduce information recorded on the optical disk 2 formed of a plurality of recording layers, based on the electrical signals obtained through conversion by the photodetector 20 of the optical pickup apparatus 1, a focus error signal for bringing the light applied to the optical disk 2 into focus on the recording layer, a tracking error signal for aligning the focal point of the light applied to the optical disk 2 with the track, and an information signal indicative of information read out from the optical disk 2 are generated by the signal generating circuit 31. Moreover, the information signal generated by the signal generating circuit 31 is converted into digital information by the reproduction processing circuit 32.

Further, based on the focus error signal and tracking error signal generated by the signal generating circuit 31, the location of the optical pickup apparatus 1 is shifted by the servo circuit 33 in such a manner that the light applied to the optical disk 2 by the optical pickup apparatus 1 can be brought into focus on the recording layer and the focal point of the light can be aligned with the track. In addition, based on the electrical signals obtained through conversion in the four-part split light-receiving element 201, the two-part split light-receiving elements 202 and 203, and the light-receiving elements 204 to 207 of the photodetector 20, the tracking error signal is generated by the signal generating circuit 31 with the differential push-pull detection method.

Accordingly, in the case of using the reproducing apparatus 100 according to the invention, stray light is received by the light-receiving elements 204 to 207, and, through conversion process, output of electrical signals can be produced therefrom. Based on the electrical signals, it is possible to remove stray light components from electrical signals obtained through conversion of light received by the two-part split light-receiving elements 202 and 203. That is, a tracking error signal can be generated on the basis of a push-pull signal corresponding to the sub beam with stray light components removed. Expressed differently, in the course of reproduction effected on the optical disk 2 formed of a plurality of recording layers, it is possible to diminish the likelihood of tracking error signal calculation being carried out incorrectly due to the presence of two-dimensionally diffusible stray light components, and thereby achieve stabilization of tracking control.

Moreover, by the signal generating circuit 31, based on the four electrical signals obtained through conversion of light received by the four regions of the four-part split light-receiving element 201, respectively, a push-pull signal MPP corresponding to reflected light of the main beam is generated, and, based on the two electrical signals obtained through conversion of light received by the two regions of the two-part split light-receiving element 202, respectively, as well as the two electrical signals obtained through conversion of light received by the two regions of the two-part split light-receiving element 203, respectively, a push-pull signal SPP1 and a push-pull signal SPP2 corresponding to reflected light of the sub beam are generated.

Further, based on the four electrical signals obtained through conversion of light received by the light-receiving elements 204 to 207, respectively, correction signals for correcting the push-pull signal SPP1 and the push-pull signal SPP2, respectively, are generated. With the resultant correction signals, the push-pull signal SPP1 and the push-pull signal SPP2 are individually subjected to correction, and based on the corrected push-pull signal SPP1 and push-pull signal SPP2, the tracking error signal is generated.

Accordingly, based on the four electrical signals obtained through conversion of light received by the light-receiving elements 204 to 207, respectively, it is possible to generate correction signals for removing stray light components from the push-pull signal SPP1 and the push-pull signal SPP2.

Moreover, based on the four electrical signals obtained through conversion of light received by the light-receiving elements 204 to 207, respectively, the intensity distribution of the stray light is calculated by the signal generating circuit 31. Then, based on the calculated intensity distribution, the correction signals at the locations of the two-part split light-receiving elements 202 and 203, respectively, are generated.

That is, by exploiting the fact that the intensity distribution of stray light conforms to Gaussian distribution, the intensity of stray light at each of the locations of the two-part split light-receiving elements 202 and 203 can be obtained by calculation as a correction signal, wherefore a push-pull signal corresponding to reflected light of the sub beam with stray light components removed can be calculated. Accordingly, the reproducing apparatus 100 according to the invention succeeds in diminishing the likelihood of tracking error signal calculation being carried out incorrectly and thus achieves stabilization of tracking control.

Although the embodiment shown in FIG. 5 exemplifies the reproducing apparatus 100 for reproducing information recorded on the optical disk 2, the invention is applicable not only to information reproduction but also to information recording on the optical disk 2; that is, applicable to a recording apparatus for recording information on the optical disk 2 or a recording/reproducing apparatus for effecting information recording and reproduction on the optical disk 2. In this case, the tracking error signal generation method of the invention is executed in the recording apparatus or the recording/reproducing apparatus.

Thus, in order to record information on the optical disk 2 formed of a plurality of recording layers, based on the electrical signals obtained through conversion by the photodetector 20 of the optical pickup apparatus 1, a focus error signal for bringing the light applied to the optical disk 2 into focus on the recording layer, a tracking error signal for aligning the focal point of the light applied to the optical disk 2 with the track, and an information signal indicative of information read out from the optical disk 2 are generated by the signal generating circuit 31. Moreover, the information signal generated by the signal generating circuit 31 is converted into digital information by the reproduction processing circuit 32.

Further, based on the focus error signal and tracking error signal generated by the signal generating circuit 31, the location of the optical pickup apparatus 1 is shifted by the servo circuit 33 in such a manner that the light applied to the optical disk 2 by the optical pickup apparatus 1 can be brought into focus on the recording layer and the focal point of the light can be aligned with the track. In addition, based on the electrical signals obtained through conversion in the four-part split light-receiving element 201, the two-part split light-receiving elements 202 and 203, and the light-receiving elements 204 to 207 of the photodetector 20, the tracking error signal is generated by the signal generating circuit 31 by using the differential push-pull detection method.

Accordingly, in the case of using the recording apparatus or the recording/reproducing apparatus according to the invention, stray light is received by the light-receiving elements 204 to 207, and, through conversion process, output of electrical signals can be produced therefrom. Based on the electrical signals, it is possible to remove stray light components from electrical signals obtained through conversion of light received by the two-part split light-receiving elements 202 and 203. That is, a tracking error signal can be generated on the basis of a push-pull signal corresponding to the sub beam with stray light components removed. Expressed differently, in the course of recording effected on the optical disk 2 formed of a plurality of recording layers, it is possible to diminish the likelihood of tracking error signal calculation being carried out incorrectly due to the presence of two-dimensionally diffusible stray light components, and thereby achieve stabilization of tracking control.

Moreover, by the signal generating circuit 31, based on the four electrical signals obtained through conversion of light received by the four regions of the four-part split light-receiving element 201, respectively, a push-pull signal MPP corresponding to reflected light of the main beam is generated, and, based on the two electrical signals obtained through conversion of light received by the two regions of the two-part split light-receiving element 202, respectively, as well as the two electrical signals obtained through conversion of light received by the two regions of the two-part split light-receiving element 203, respectively, a push-pull signal SPP1 and a push-pull signal SPP2 corresponding to reflected light of the sub beam are generated.

Further, based on the four electrical signals obtained through conversion of light received by the light-receiving elements 204 to 207, respectively, correction signals for correcting the push-pull signal SPP1 and the push-pull signal SPP2, respectively, are generated. With the resultant correction signals, the push-pull signal SPP1 and the push-pull signal SPP2 are individually corrected, and based on the corrected push-pull signal SPP1 and push-pull signal SPP2, the tracking error signal is generated.

Accordingly, based on the four electrical signals obtained through conversion of light received by the light-receiving elements 204 to 207, respectively, it is possible to generate correction signals for removing stray light components from the push-pull signal SPP1 and the push-pull signal SPP2.

Moreover, based on the four electrical signals obtained through conversion of light received by the light-receiving elements 204 to 207, respectively, the intensity distribution of the stray light is calculated by the signal generating circuit 31. Then, based on the calculated intensity distribution, the correction signals at the locations of the two-part split light-receiving elements 202 and 203, respectively, are generated.

That is, by exploiting the fact that the intensity distribution of stray light conforms to Gaussian distribution, the intensity of stray light at each of the locations of the two-part split light-receiving elements 202 and 203 can be obtained by calculation as a correction signal, wherefore a push-pull signal corresponding to reflected light of the sub beam with stray light components removed can be calculated. Accordingly, the recording apparatus of the invention succeeds in diminishing the likelihood of tracking error signal calculation being carried out incorrectly and thus achieves stabilization of tracking control.

Figure 6:
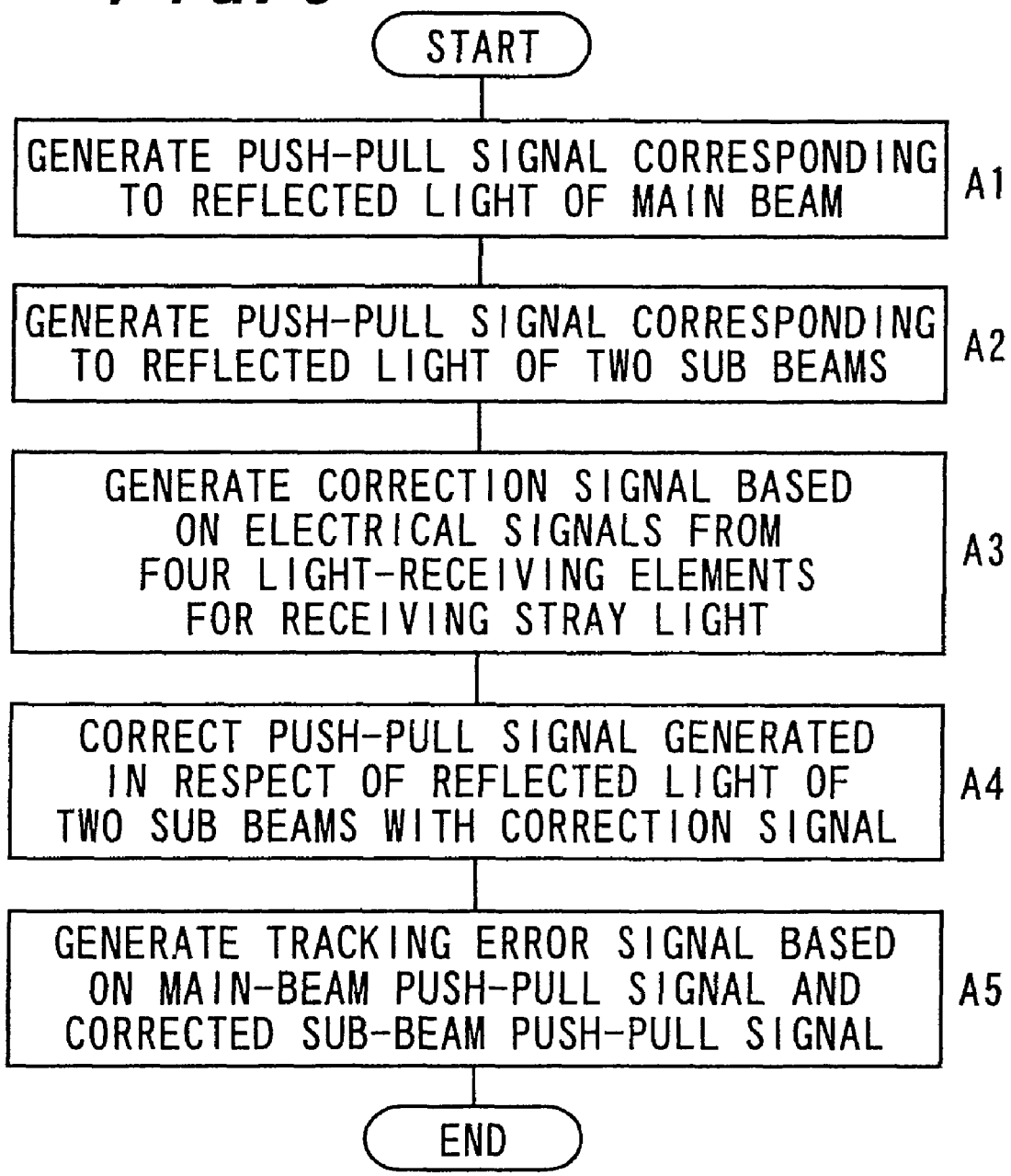
FIG. 6 is a flow chart showing a procedure for tracking error signal generation process to be executed by a signal generating circuit.

FIG. 6 is a flow chart showing a procedure for tracking error signal generation process to be executed by the signal generating circuit 31. Upon start-up of information recording or reproduction process following the spinning of the optical disk 2, the procedure proceeds to Step A1.

In Step A1, which is a first push-pull signal generation step, based on the electrical signals detected in the four regions of the four-part split light-receiving element 201, a push-pull signal MPP corresponding to reflected light of the main beam is generated by calculation using Equation (9). In Step A2, which is a second and third push-pull signal generation step, based on the two electrical signals detected in the two regions of the two-part split light-receiving element 202, as well as the two electrical signals detected in the two regions of the two-part split light-receiving element 203, a push-pull signal SPP1 and a push-pull signal SPP2 corresponding to reflected light of the two sub beams are generated by calculation using Equations (10) and (11).

In Step A3, which is a correction signal generation step, based on the electrical signals corresponding to the stray light detected in the light-receiving elements 204 to 207, correction signals are generated by calculation using Equation (1). To be specific, the intensity of the stray light at each of the locations of the regions of the two-part split light-receiving elements, namely the correction signals $I_{ME}$, $I_{MF}$, $I_{MG}$, and $I_{MH}$ are generated by calculation using Equations (5) to (8). In Step A4, which is a correction step, the push-pull signal SPP1 and the push-pull signal SPP2 corresponding to reflected light of the two sub beams are corrected with the correction signals $I_{ME}$, $I_{MF}$, $I_{MG}$, and $I_{MH}$ according to Equations (13) and (14).

In Step A5, which is a generation step, based on the push-pull signal MPP corresponding to reflected light of the main beam and the corrected push-pull signal SPP1 and push-pull signal SPP2 corresponding to reflected light of the two sub beams, a tracking error signal DPP is generated by calculation using Equation (11). Then, the tracking error signal generation process comes to an end.

Thus, according to the flow chart shown in FIG. 6, in order to generate tracking error signals for use in the reproducing apparatus 100 or the above-stated recording apparatus, in Step A1, based on the four electrical signals obtained through conversion of light received by the four regions of the four-part split light-receiving element 201, respectively, the push-pull signal MPP corresponding to reflected light of the main beam is generated. In Step A2, based on the two electrical signals obtained through conversion of light received by the two regions of the two-part split light-receiving element 202, respectively, as well as the two electrical signals obtained through conversion of light received by the two regions of the two-part split light-receiving element 203, respectively, the push-pull signal SPP1 and the push-pull signal SPP2 corresponding to reflected light of the sub beam are generated.

In Step A3, based on the four electrical signals obtained through conversion of light received by the light-receiving elements 204 to 207, respectively, the correction signals for correcting the push-pull signal SPP1 and the push-pull signal SPP2, respectively, are generated. In Step A4, with the resultant correction signals generated in Step A3, the push-pull signal SPP1 and the push-pull signal SPP2 generated in Step A2 are individually corrected.

In Step A5, based on the push-pull signal SPP1 and the push-pull signal SPP2 corrected in Step A4, the tracking error signal is generated by using the differential push-pull detection method.

Accordingly, with the application of the tracking error signal generation method of the invention, it is possible to produce output of electrical signals obtained through conversion of stray light received by the light-receiving elements 204 to 207, respectively. Based on the electrical signals, it is possible to remove stray light components from electrical signals obtained through conversion of light received by the two-part split light-receiving elements 202 and 203. That is, a tracking error signal can be generated on the basis of a push-pull signal corresponding to the sub beam with stray light components removed. Expressed differently, in the course of recording or reproduction effected on the optical disk 2 formed of a plurality of recording layers, it is possible to diminish the likelihood of tracking error signal calculation being carried out incorrectly due to the presence of two-dimensionally diffusible stray light components, and thereby achieve stabilization of tracking control.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. An optical pickup apparatus comprising:
a light source for emitting light;
a light-receiving section for receiving light and converting an optical signal included in the received light into an electrical signal; and
an optical system that generates a main beam of zeroth-order diffraction light and sub beams of + first-order diffraction light and − first-order diffraction light by diffracting light emitted from the light source, applies the resultant main and sub beams to one of a plurality of recording layers constituting an optical recording medium, and directs reflected light from the optical recording medium toward the light-receiving section,
the light-receiving section including:
a first light-receiving element having four regions divided by a straight line extending in a direction of a tangent to a track formed on the optical recording medium and a straight line extending in a direction of a normal to the track, for receiving main-beam reflected light;
a second light-receiving element and a third light-receiving element which are disposed individually on either side of the first light-receiving element in the direction of the normal and each have two regions divided by the straight line extending in the direction of the tangent, for receiving sub-beam reflected light;
a fourth light-receiving element disposed between the first light-receiving element and the second light-receiving element, for receiving stray light reflected from, out of the plurality of recording layers, the one other than the recording layer irradiated with the main and sub beams;
a fifth light-receiving element disposed between the first light-receiving element and the third light-receiving element, for receiving the stray light; and
a sixth light-receiving element and a seventh light-receiving element disposed individually on either side of the first light-receiving element in the direction of the tangent, for receiving the stray light
wherein the fourth light-receiving element and the fifth light-receiving element are so positioned that a distance between the first light-receiving element and the fourth light-receiving element differs from a distance between the first light-receiving element and the fifth light-receiving element, and
wherein the sixth light-receiving element and the seventh light-receiving element are so positioned that a distance between the first light-receiving element and the sixth light-receiving element differs from a distance between the first light-receiving element and the seventh light-receiving element.

2. The optical pickup apparatus of claim 1, wherein light-receiving surfaces of the respective fourth to seventh light-receiving elements have a same area.

3. A reproducing apparatus for reproducing information recorded on an optical recording medium formed of a plurality of recording layers, comprising:
- the optical pickup apparatus of claim 1;
- a signal generating section for generating, based on electrical signals obtained through conversion by the light-receiving section of the optical pickup apparatus, a focus error signal for bringing light applied to the optical recording medium into focus on the recording layer, a tracking error signal for aligning a focal point of the light applied to the optical recording medium with a track, and an information signal indicative of information read out from the optical recording medium;
- a reproduction processing section for converting the information signal generated by the signal generating section into digital information; and
- a shifting section for shifting a location of the optical pickup apparatus, based on the focus error signal and the tracking error signal generated by the signal generating section, in such a manner that light applied to the optical recording medium by the optical pickup apparatus can be brought into focus on the recording layer and a focal point of the light can be aligned with the track,
- the signal generating section generating the tracking error signal, based on electrical signals obtained through conversion in the first to seventh light-receiving elements of the light-receiving section, by using a differential push-pull detection method.

4. The reproducing apparatus of claim 3, wherein the signal generating section generates a first push-pull signal corresponding to main-beam reflected light based on four electrical signals obtained through conversion of light received by the four regions of the first light-receiving element, respectively,
- the signal generating section generates a second push-pull signal and a third push-pull signal corresponding to sub-beam reflected light based on two electrical signals obtained through conversion of light received by the two regions of the second light-receiving element, respectively, as well as two electrical signals obtained through conversion of light received by the two regions of the third light-receiving element, respectively,
- the signal generating section generates correction signals for correcting the second push-pull signal and the third push-pull signal, respectively, based on four electrical signals obtained through conversion of light received by the fourth to seventh light-receiving elements, respectively, and
- the signal generating section corrects the second push-pull signal and the third push-pull signal individually with the resultant correction signals and then generates the tracking error signal based on the corrected second and third push-pull signals.

5. The reproducing apparatus of claim 4, wherein the signal generating section calculates intensity distribution of the stray light based on the four electrical signals obtained through conversion of light received by the fourth to seventh light-receiving elements, respectively, and generates correction signals corresponding to the locations of the second light-receiving element and the third light-receiving element, respectively, based on the calculated intensity distribution.

6. A recording apparatus for recording information on an optical recording medium formed of a plurality of recording layers, comprising:
- the optical pickup apparatus of claim 1;
- a signal generating section for generating, based on electrical signals obtained through conversion by the light-receiving section of the optical pickup apparatus, a focus error signal for bringing light applied to the optical recording medium into focus on the recording layer, a tracking error signal for aligning a focal point of the light applied to the optical recording medium with a track, and an information signal indicative of information read out from the optical recording medium;
- a reproduction processing section for converting the information signal generated by the signal generating section into digital information; and
- a shifting section for shifting a location of the optical pickup apparatus, based on the focus error signal and the tracking error signal generated by the signal generating section, in such a manner that light applied to the optical recording medium by the optical pickup apparatus can be brought into focus on the recording layer and a focal point of the light can be aligned with the track,
- the signal generating section generating the tracking error signal, based on electrical signals obtained through conversion in the first to seventh light-receiving elements of the light-receiving section, by using a differential push-pull detection method.

7. The recording apparatus of claim 6, wherein the signal generating section generates a first push-pull signal corresponding to main-beam reflected light based on four electrical signals obtained through conversion of light received by the four regions of the first light-receiving element, respectively,
- the signal generating section generates a second push-pull signal and a third push-pull signal corresponding to sub-beam reflected light based on two electrical signals obtained through conversion of light received by the two regions of the second light-receiving element, respectively, as well as two electrical signals obtained through conversion of light received by the two regions of the third light-receiving element, respectively,
- the signal generating section generates correction signals for correcting the second push-pull signal and the third push-pull signal, respectively, based on four electrical signals obtained through conversion of light received by the fourth to seventh light-receiving elements, respectively, and
- the signal generating section corrects the second push-pull signal and the third push-pull signal individually with the resultant correction signals and then generates the tracking error signal based on the corrected second and third push-pull signals.

8. The recording apparatus of claim 7, wherein the signal generating section calculates intensity distribution of the stray light based on the four electrical signals obtained through conversion of light received by the fourth to seventh light-receiving elements, respectively, and generates correction signals corresponding to the locations of the second lightreceiving element and the third light-receiving element, respectively, based on the calculated intensity distribution.

9. A tracking error signal generation method for generating tracking error signals for use in the reproducing apparatus of claim 3 or the recording apparatus of claim 6, comprising:
- a first push-pull signal generation step of generating a first push-pull signal corresponding to main-beam reflected light based on four electrical signals obtained through conversion of light received by the four regions of the first light-receiving element, respectively;
- a second and third push-pull signal generation step of generating a second push-pull signal and a third push-pull signal corresponding to sub-beam reflected light based on two electrical signals obtained through conversion of light received by the two regions of the second light-receiving element, respectively, as well as two electrical signals obtained through conversion of light received by the two regions of the third light-receiving element, respectively;

a correction signal generation step of generating correction signals for correcting the second push-pull signal and the third push-pull signal, respectively, based on four electrical signals obtained through conversion of light received by the fourth to seventh light-receiving elements, respectively;

a correction step of correcting the second push-pull signal and the third push-pull signal generated in the second and third push-pull signal generation step individually with the correction signals generated in the correction signal generation step; and a generation step of generating the tracking error signal, based on the second push-pull signal and the third push-pull signal corrected in the correction step, by using a differential push-pull detection method.

* * * * *